United States Patent [19]

Miyakawa et al.

[11] Patent Number: 5,555,864

[45] Date of Patent: Sep. 17, 1996

[54] ELECTRIC SOURCE CONTROL DEVICE OF INTERNAL COMBUSTION ENGINE DRIVE VEHICLE

[75] Inventors: Tsutomu Miyakawa; Hideki Nishihara; Takaaki Kuga; Kazunori Shinohara; Makoto Ishikawa, all of Ehime, Japan

[73] Assignee: Hukuto Manufacturing Co., Ltd., Japan

[21] Appl. No.: 244,868

[22] PCT Filed: Oct. 13, 1993

[86] PCT No.: PCT/JP93/01468

§ 371 Date: Aug. 2, 1995

§ 102(e) Date: Aug. 2, 1995

[87] PCT Pub. No.: WO95/10704

PCT Pub. Date: Apr. 20, 1995

[51] Int. Cl.$^6$ ............................................ F02N 11/08
[52] U.S. Cl. ........................... 123/179.28; 123/179.1; 290/36 R; 290/50; 307/10.6
[58] Field of Search ..................... 123/179.28, 179.3, 123/179.1; 290/36 R, 50; 307/10.6

[56] References Cited

U.S. PATENT DOCUMENTS

| | | | |
|---|---|---|---|
| 1,782,940 | 11/1930 | Saives | 307/10.6 |
| 2,729,750 | 1/1956 | Draper et al. | 290/36 R |
| 2,730,630 | 1/1956 | Bruno | 290/36 R |
| 3,477,026 | 11/1969 | Plugge | 307/10.6 |
| 4,754,730 | 7/1988 | Campagna | 123/179.28 |

*Primary Examiner*—Andrew M. Dolinar
*Attorney, Agent, or Firm*—Bierman & Muserlian

[57] ABSTRACT

The electric source control device of an internal combustion engine drive vehicle according to the present invention is characterized in that it consists of a primary battery (1) and a secondary battery (2) which are mounted on the internal combustion engine drive vehicle, which are provided with a common terminal (3) of (+) polarity and two independent terminals (4, 5) of (−) polarity and which supply an engine starter and loads with electricity, and a control circuit in which when an engine switch (9) is not connected with the starting point the terminal (4) of (−) polarity of the primary battery (1) is disconnected from that (5) of the secondary battery (2) to make only one of both the batteries and in which when the engine switch (9) is connected with the starting point both the batteries (1, 2) supply the engine starter (6) and the loads in parallel with electricity, either of the terminals (4, 5) of (−) polarity of both the batteries (1, 2) being connected with the terminals of (+) polarity of the engine starter and the loads alternately.

5 Claims, 3 Drawing Sheets

ELECTRIC SOURCE CONTROL DEVICE OF INTERNAL COMBUSTION ENGINE DRIVE VEHICLE

TECHNICAL FIELD

The present invention relates to an electric source control device of an internal combustion engine drive vehicle provided with a primary battery and a secondary battery which are charged in parallel by a generator.

BACKGROUND TECHNOLOGY

Generally speaking, the excessive discharge of a battery of an internal combustion engine drive vehicle such as an automobile often causes the impossibility of starting resulting from the lack of the electricity remaining in the battery and hence the lack of the power for starting an engine starter. A reason why such an accident occurs is that a driver drives the vehicle for a long time without exchanging the battery, but a stronger reason is that a driver uses a room air-conditioner and lights in the vehicle during stopping because of a traffic jam at night which is one of recent traffic problems.

A conventional method for resolving such a problem is to use a spare battery by manual operation, but there is a problem in the method that it is necessary to charge the battery supplementarily by manual operation according to circumstance as a matter of course.

Thus the purpose of the present invention is to supply people with an electric source control device of an internal combustion engine drive vehicle provided with a primary battery and a secondary battery kept in a state in which they are always charged to make it unnecessary to change the battery manually when it is almost discharged.

DISCLOSURE OF THE INVENTION

An electric source control device of an internal combustion engine drive vehicle according to the present invention is characterized in that it consists of a primary battery and a secondary battery which are mounted on the internal combustion engine drive vehicle, which are provided with a common terminal of (+) polarity and two independent terminals of (−) polarity and which are used to supply an engine starter and loads with electricity, a generator which is used to charge said primary battery and said secondary battery in parallel and which is driven by an engine mounted on said internal combustion engine drive vehicle, a primary control contact point which is used to connect the terminal of (−) polarity of said primary battery with the terminal of (−) polarity of said secondary battery and to disconnect the former from the latter, a secondary control contact point which is used to connect ether of said terminals of (−) polarity of said primary battery and said secondary battery alternately with minus terminals of said engine starter and said loads, a tertiary control contact point which is used to connect said primary battery and said secondary battery with said engine starter when an engine switch is connected with a starting point, and a control circuit in which when said engine switch is not connected with the starting point said primary control contact point moves to its OFF position to disconnect the terminals of (−) polarity of said primary battery from that of said secondary battery, and said secondary control contact point is connected with only one of the terminal of (−) polarity of said primary battery and that of said secondary battery to make only one of said primary battery and said secondary battery supply said loads with electricity and in which when said engine switch is connected with the starting point said primary control contact point and said tertiary control contact point move to their ON positions to make both of said primary battery and said secondary battery supply said engine starter and said loads with electricity in parallel and said secondary control contact point is switched to be connected with one of the terminal of (−) polarity of said primary battery and said secondary battery from the other of the terminals of (−) polarity of said primary battery and said secondary battery.

According to the present invention, when the engine switch is connected with the starting point for example by turning an engine switch, the engine starter is started by supplying it with electricity through both of the primary battery and the secondary battery in parallel.

After the engine switch is disconnected from the starting point the engine having started, the loads are supplied with electricity through either of the primary battery and the secondary battery, the generator charges the primary battery and the secondary battery in parallel and thus smooth restarting after stopping the engine can be realized.

Every time the engine switch is connected with the starting point, one of the primary battery and the secondary battery which has been connected with the load is disconnected from it and the other of them is connected with it. Therefore the primary battery and the secondary battery can be used alternately and equally.

According to the present invention as described above, the primary battery and the secondary battery can be used alternately and equally without changing manually and kept in a state in which they are charged so that they may be always used, and hence the effect of the present invention is that it can make it easy to start the engine again after having driven at night or after having used a car air conditioner.

BEST CONDITIONS FOR WORKING THE INVENTION

Figure 1:
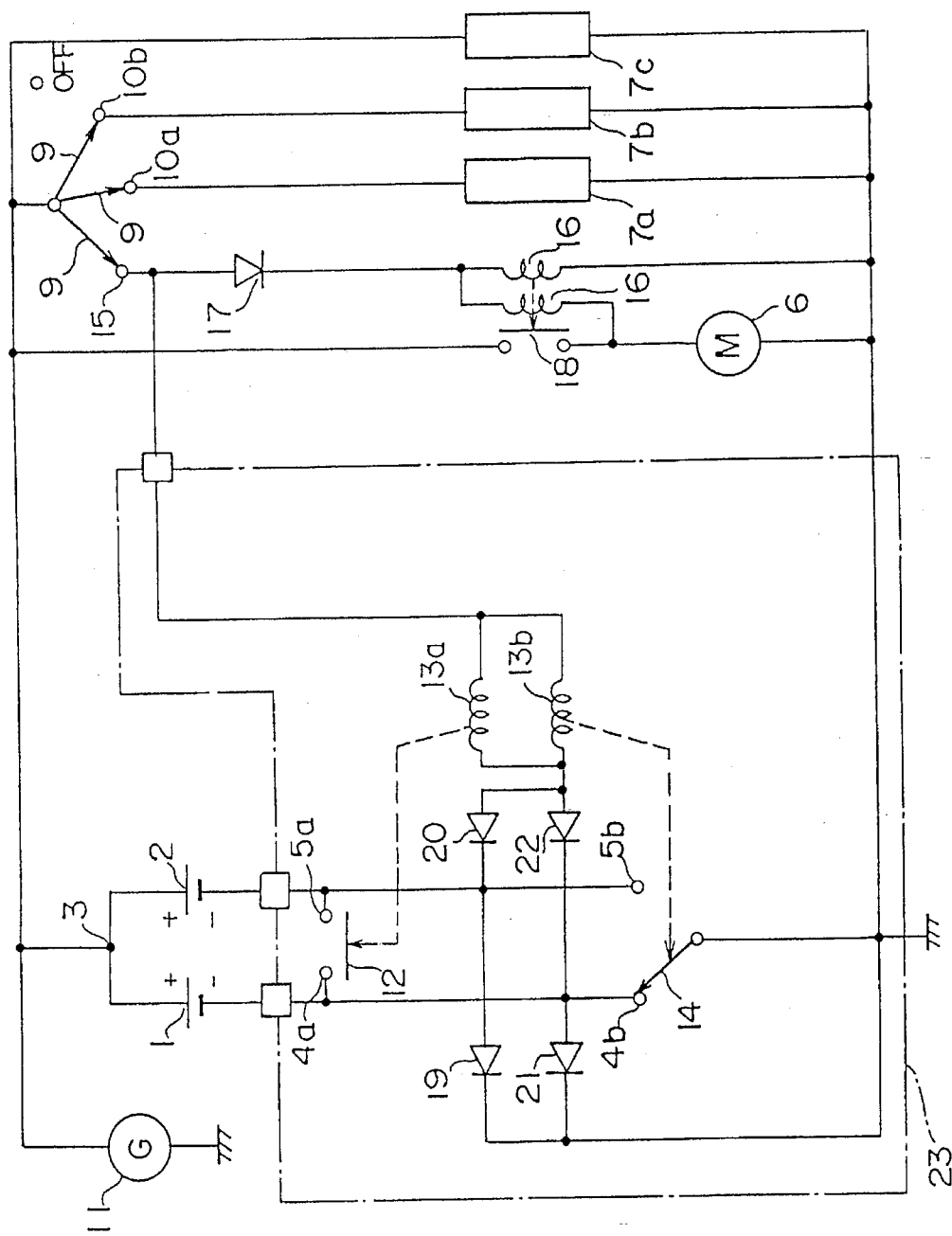
FIG. 1 shows an electric circuit of a primary embodiment of the present invention.

We explain below the present invention based on its embodiments referring to drawings. FIG. 1 shows a primary embodiment of the present invention.

A primary battery 1 and a secondary battery 2 which are mounted on an internal combustion engine drive vehicle such as an automobile and a ship are provided with a common terminal 3 of (+) polarity and two pairs of independent terminals of (−) polarity one pair (4a, 4b) of which the primary battery 1 is provided with and the other pair (5a, 5b) of which the secondary battery 2 is provide with, and supply an engine starter 6 and loads 7a, 7b, 7c with electricity. The loads 7a, 7b are provided with electricity only when a key switch which is an example of an engine switch is turned from its OFF position and connected with a starting point, or a terminal 10a or a terminal 10b.

In this embodiment, a key switch 9 which is an example of an engine switch can be connected with a starting point or disconnected from it by turning, but the key switch 9 may be replaced with a button type switch or the other type switch as an engine switch and the constitution of the engine switch is limited to one type.

A generator 11 driven by the engine of the internal combustion engine drive vehicle charges the primary battery 1 and the secondary battery 2 in parallel through the common terminal 3 of (+) polarity.

A primary control contact point 12 is controlled by an electromagnetic coil 13a and can connect the terminal 4a of (−) polarity of the primary battery 1 with the terminal 5a of (−) polarity of the secondary battery 2 or disconnect the former from the latter.

A secondary control contact point 14 is controlled by an electromagnetic coil 13b and can connect either of terminals 4a, 4b of (−) polarity of the primary battery 1 and the secondary battery 2 alternately with terminals of (−) polarity of the engine starter 6 and the loads 7a, 7b, 7c.

A tertiary control contact point 18 can connect the primary battery 1 and the secondary battery 2 with the engine starter 6 when the key switch 9 is turned to the starting point and connected with terminals 15, 10a, 10b.

A control circuit is constituted as described below.

When the switch 9 is not connected with a starting point, namely either of terminals 15, 10a, 10b, the primary control contact point 12 is at its OFF position, that is to say, the terminal 4a of (−)polarity of the primary battery 1 is not connected with the terminal 5a of (−) polarity of the secondary battery 2, the secondary control contact point 14 is connected with only one of the terminals 4b, 5b of the primary battery 1 and the secondary battery 2 and hence only one of the primary battery 1 and the secondary battery 2 supplies the load 7c and, as the case may be, the loads 7a, 7b with electricity.

Next, when the key switch 9 is turned to the starting point and connected with terminals 15, 10a, 10b, the electromagnetic coils 13a, 13b and an electromagnetic coil 16 of a starter relay are supplied with electricity through a one-way diode 17, the primary control contact point 12 and the tertiary control contact point 18 of a starter relay come to their ON positions, both of the primary battery 1 and the secondary battery 2 supply the engine starter 6 in parallel with electricity and the engine which is not illustrated is started.

When this key switch 9 is connected with the starting point namely the terminals 15, 10a, 10b, the primary control contact point 12 goes to its ON position and hence both of the primary battery 1 and the secondary battery 2 supply all loads 7a, 7b, 7c in parallel with electricity.

Diodes 19, 21 are arranged for charging the primary battery 1 and the secondary battery 2 through the generator 11. Diodes 20, 22 are connected with the terminals 4b, 5b of (−) polarity of the primary battery 1 and the secondary battery 2 respectively so that they may function as an OR circuit for both the batteries 1,2.

After the engine has been started and then the key switch 9 has been disconnected from the starting points, namely the terminals 15, 10a, 10b, either of the primary battery 1 and the secondary battery 2 supply the loads 7a, 7b, 7c with electricity, the generator 11 charges both the batteries 1, 2 in parallel and hence the smooth restarting the engine after having stopped can be realized.

In case the key switch 9 returns to its OFF position every time it is turned to the starting point, the primary battery 1 and the secondary battery 2 alternate in the connection with the loads 7a, 7b, 7c and hence both the batteries can be used alternately and equally.

The main constituents of the control circuit described above which is encircled by a chain line 23 may be put in a case.

Also the main constituents of the control circuit and both the batteries 1, 2 may be put in a case.

Figure 2:
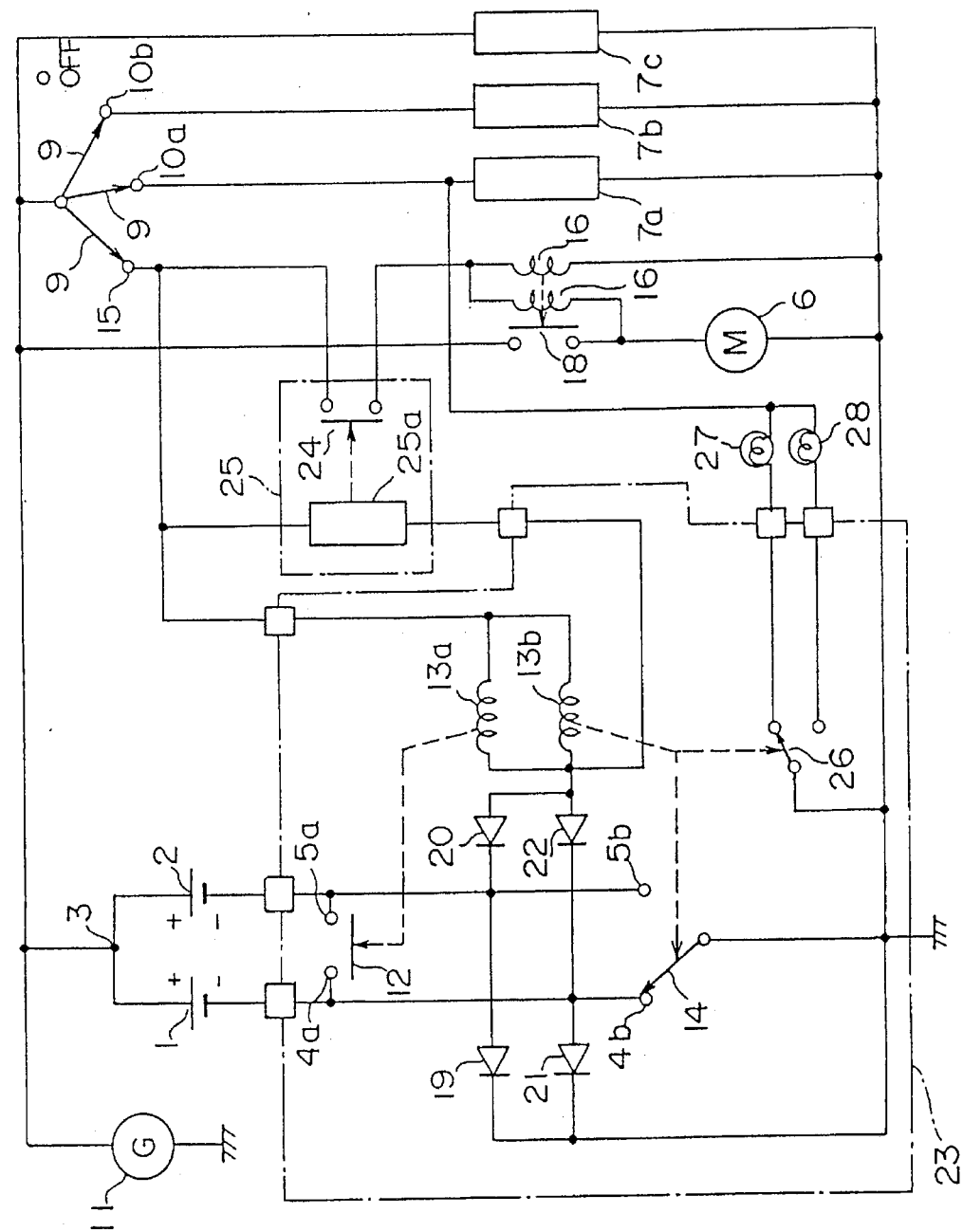
FIG. 2 shows an electric circuit of a secondary embodiment of the present invention.

FIG. 2 shows a circuit of a secondary embodiment of the present invention.

Most of the constitution and the action of the circuit shown in FIG. 2 are common to those of the circuit shown in FIG. 1, but the different points between them are as follows.

When the key switch 9 is turned to the starting point and connected with the terminals 15, 10a, 10b, the electromagnetic coils 13a, 13b are energized, but a fourth control contact point 24 which functions as a one-way diode moves to its ON position a few time late by the aid of a timer 25a and then the primary battery 1 and the secondary battery 2 supply the engine starter 6 with electricity. The timer 25a and the fourth control contact point 24 constitute a timer relay 25 which decreases sparks and noise during the ON-OFF action of the secondary control contact point 14 prolonging the life of the secondary control contact point 14.

The fourth control contact point 24 of the timer relay 25 has an effect of voltage drop remarkably less than the one-way diode 17 shown in the primary embodiment in FIG. 1.

In this embodiment, a switch 26 moving simultaneously with the secondary control contact point 14 lights an indication lamp 27 or 28 to indicate which one of the primary battery 1 and the secondary battery 2 supply the load with electricity.

Figure 3:
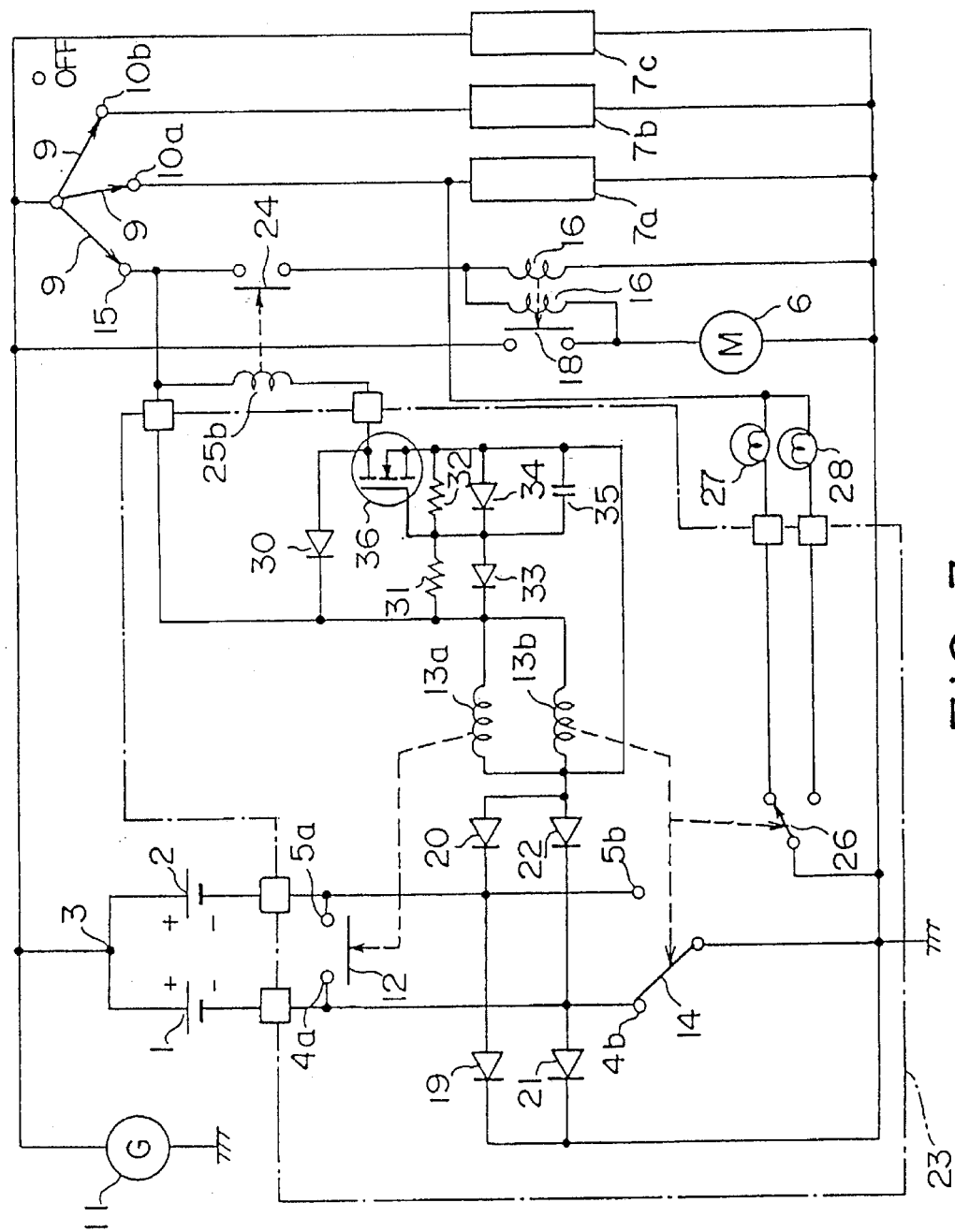
FIG. 3 shows an electric circuit of a tertiary embodiment of the present invention.

FIG. 3 shows a circuit of a tertiary embodiment of the present invention.

Most of the constitution and the action of the circuit shown in FIG. 3 is common to those of the circuit shown in FIG. 2, but different points between them are as follows. An electromagnetic coil 25b constitutes a delay circuit instead of a timer relay 25 shown in FIG. 2 to make the fourth control contact point 24 move to its ON position.

The delay circuit comprises a diode 30, resistances 31, 32, diodes 33, 34, a condenser 35 and a power MOS FET 36.

We claim:

1. An electric source control device of an internal combustion engine drive vehicle characterized in that it comprises a primary battery and a secondary battery which are mounted on said internal combustion engine drive vehicle, which are provided with a common terminal of (+) polarity and two independent terminals of (−) polarity and which supply an engine starter and loads with electricity, a generator which charges said primary battery and said secondary battery through said common terminal of (+) polarity and which is driven by the engine of said internal combustion engine drive vehicle, a primary control contact point which can connect the terminal of (−) polarity of said primary battery with the terminal of (−) polarity of said secondary battery and which can disconnect the former from the latter, a secondary control contact point which can connect either of said terminals of (−) polarity of said primary battery and said secondary battery alternately with terminals of (−) polarity of said engine starter and said loads, a tertiary control contact point which can connect said primary battery and said secondary battery with said engine starter when an engine switch is connected with the starting point, and a control circuit in which when said engine switch is not connected with the starting point said primary control contact point moves to its OFF position to disconnect the terminal of (−) polarity of said primary battery from that of said secondary battery and said secondary control contact point is connected with only one of the terminals of (−) polarity of said primary battery and that of said secondary battery to make only one of said batteries supply said loads with electricity and in which when said engine switch is connected with the starting point, said primary control contact point and said tertiary control contact point move to their ON positions to make both of said batteries supply said engine starter and said loads in parallel with electricity and simultaneously said secondary control contact point is switched to be connected with the one of the terminals of (−) polarity of said primary battery and said secondary battery from the other of the terminals of (−) polarity of said primary battery and said secondary battery.

2. An electric source control device of an internal combustion engine drive vehicle of claim 1 wherein a fourth control contact point is set between said engine switch and an electromagnetic coil for controlling said tertiary control contact point, said fourth control contact point moving to its ON position to make said primary battery and said secondary battery supply said engine starter with electricity a few times later than the actions of said primary control contact point and said secondary control contact point when said engine switch is connected with the starting point.

3. An electric source control device of an internal combustion engine drive vehicle of claim 1 wherein main constituents of said control circuit are put in a case.

4. An electric source control device of an internal combustion engine drive vehicle of claim 1 wherein said primary battery, said secondary battery and main constituents of said control circuit are put in a case.

5. An electric source control device of an internal combustion engine drive of claim 2 wherein said primary battery, said secondary battery and main constituents of said control circuit are put in a case.

* * * * *